F. A. FORD.
PROTECTIVE MEANS AGAINST LIGHTNING.
APPLICATION FILED DEC. 19, 1918.
1,330,858. Patented Feb. 17, 1920.
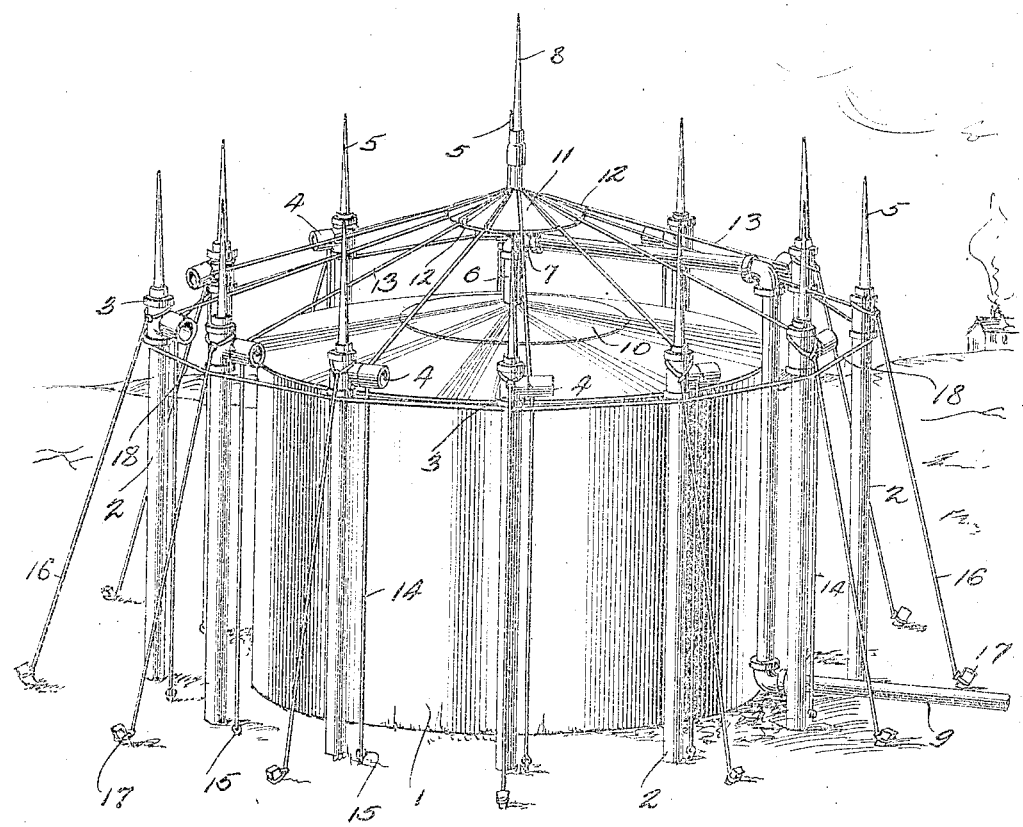

UNITED STATES PATENT OFFICE.

FRANK A. FORD, OF GLENPOOL, OKLAHOMA.

PROTECTIVE MEANS AGAINST LIGHTNING.

1,330,858.   Specification of Letters Patent.   Patented Feb. 17, 1920.

Application filed December 19, 1918. Serial No. 267,494.

*To all whom it may concern:*

Be it known that I, FRANK A. FORD, a citizen of the United States, residing at Glenpool, in the county of Tulsa and State of Oklahoma, have invented certain new and useful Improvements in Protective Means Against Lightning, of which the following is a specification.

This invention is designed primarily for protecting oil tanks from being struck by lightning and the contents thereof set on fire. Obviously the invention may be utilized for protecting tanks and analogous structures.

The drawing illustrates a preferred embodiment of the invention, however, it is to be understood that in adapting the same to meet different conditions, various changes in the form, proportion, and minor details of construction may be resorted to without departing from the nature of the invention as claimed hereinafter and as shown in the accompanying drawing which is a perspective view of an oil tank embodying protective means constructed in accordance with the invention.

The tank 1 may be of any construction such as generally provided for holding oil in quantity and is typical of any like structure adapted to be protected from being struck by lightning in accordance with the principles of the present invention.

A plurality of posts 2 are set about the tank at stated intervals and are let into the ground. T fittings 3 are applied to the upper ends of the posts 2 and the latter are of a length so that the T fittings are disposed some distance above the top of the tank. The T fittings are arranged with two of their branches in line with the respective posts to which they are attached and with the third branch disposed horizontally and receiving an insulator 4. Points or tips 5 are secured to the upper branches of the T fittings and may be of any material commonly employed in the construction of lightning rods.

A center post 6 connects with the tank 1 and embodies a T-fitting 7. A tip or point 8 is connected with the upper branch of the T fittings 7. The post 6 may consist of a length of pipe and may be utilized as means for venting the tank so as to prevent accumulation of gas therein. A vent pipe 9 connects with the horizontal branch of the fitting 7 and carries off any accumulation of gas to a convenient point of discharge. A plate 10 is secured to the center portion of the top of the tank and serves as reinforcing means therefor and the post 6 is braced thereby.

A plate 11 is secured to the upper end of the center post 6 and is of conical form and provided with radial ribs 12 to which radial wires 13 are attached, said wires being connected at their outer ends to the insulators 4 and thence extending downwardly as indicated at 14 and secured at their lower ends to metal pegs 15 driven into the ground so as to discharge any lightning into the earth. Guy wires 16 are connected at their upper ends to the T fittings 3 and their lower ends are attached to stakes 17 driven into the ground some distance from the posts 2.

It will be understood that the protector is of such construction and arrangement as to envelop the tank or like structure and prevent the same from being struck by lightning, since the latter would be attracted by one or more of the points 5 and 8 and directed to earth by the conducting wires or like elements 13 and 14. A wire or like conducting element 18 connects the upper ends of the posts 2 and serves to hold them apart the predetermined distance. This conductor 18 may also serve to ground any lightning that may be received thereby.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:—

Protective means of the character set forth, comprising a center post provided with a lightning attracting tip or point, a conical plate supported upon the upper end of the center post and having radial ribs, other posts grouped about the center post and provided at their upper ends with lightning attracting points or tips, lightning conductors connected with the ribs of the said plate and radiating therefrom and connected at their outer ends to the surrounding posts and passing downwardly and grounded at their lower ends.

In testimony whereof I affix my signature in presence of two witnesses.

FRANK A. FORD.

Witnesses:
J. G. HATHAM,
G. C. PATTON.